(12) United States Patent
Akiyama (10) Patent No.: US 10,627,710 B2
(45) Date of Patent: Apr. 21, 2020

(54) LIGHT SOURCE APPARATUS AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/445,343

(22) Filed: Jun. 19, 2019

(65) Prior Publication Data

US 2019/0391477 A1    Dec. 26, 2019

(30) Foreign Application Priority Data

Jun. 20, 2018    (JP) .................... 2018-116908

(51) Int. Cl.
*G03B 21/20* (2006.01)
*H04N 9/31* (2006.01)

(52) U.S. Cl.
CPC ..... *G03B 21/2033* (2013.01); *G03B 21/2073* (2013.01); *H04N 9/3158* (2013.01); *H04N 9/3161* (2013.01); *H04N 9/3164* (2013.01)

(58) Field of Classification Search
CPC ............ G03B 21/2033; G03B 21/2073; H04N 9/3158; H04N 9/3161; H04N 9/3164; G02B 27/283

USPC .......................................................... 353/20
See application file for complete search history.

(56) References Cited

U.S. PATENT DOCUMENTS

2016/0353069 A1    12/2016   Chikahisa
2019/0179220 A1*   6/2019    Hu ..................... G03B 21/206

FOREIGN PATENT DOCUMENTS

JP           2016-224304 A      12/2016

* cited by examiner

*Primary Examiner* — Steven Whitesell Gordon
*Assistant Examiner* — Jerry L Brooks
(74) *Attorney, Agent, or Firm* — Oliff PLC (57) ABSTRACT

A light source apparatus includes a blue laser light emitter, a red laser light emitter, a phosphor that produces yellow fluorescence, a first optical element that combines the yellow fluorescence with a second component of the blue laser light to produce first combined light containing a red component, a green component, and a blue component, a second optical element that reflects the red laser light, transmits a first polarized component in the red component, reflects a second polarized component in the red component, transmits the green component and the blue component, and combines the red laser light, the first polarized component, the green component, and the blue component with one another to produce second combined light, a retardation film provided at a downstream side of the second optical element, and a third optical element that combines part of third combined light with the second polarized component to produce illumination light.

20 Claims, 3 Drawing Sheets

LIGHT SOURCE APPARATUS AND PROJECTOR

The present application is based on, and claims priority from JP Application Serial Number 2018-116908, filed Jun. 20, 2018, the disclosure of which is hereby incorporated by reference herein in its entirety

BACKGROUND

1. Technical Field

The present disclosure relates to a light source apparatus and a projector.

2. Related Art

In recent years, as a light source apparatus used in a projector, there is a technology for combining blue laser light with yellow fluorescence produced by excitation with the blue laser light to produce illumination light. Further, JP-A-2016-224304 discloses a light source apparatus that combines yellow fluorescence, blue laser light, and red laser light with one another and outputs the combined light.

JP-A-2016-224304 is an example of the related art.

In the light source apparatus described above, the illumination light is produced by causing the fluorescence to pass through a combining mirror and the red laser light to be reflected off the combining mirror to output the two types of light in the same direction.

For example, in a case where the combining mirror has high transmittance of a red component contained in the fluorescence, the increased amount of red laser light passing through the combining mirror increases the amount of optical loss of the red laser light. On the other hand, in a case where the combining mirror has high reflectance of the red laser light, the increased reflection amount of the red component contained in the fluorescence by the combining mirror increases the amount of optical loss of the fluorescence. As described above, the light source apparatus described above cannot efficiently assist the red light because one of the red component of the fluorescence and the red laser light is always partially lost.

SUMMARY

A light source apparatus according to an aspect of the present disclosure includes a blue laser light emitter that emits blue laser light, a red laser light emitter that emits red laser light, a phosphor that produces yellow fluorescence when excited by a first component of the blue laser light, a first optical element that combines the yellow fluorescence with a second component of the blue laser light to produce first combined light containing a red component, a green component, and a blue component, a second optical element that is provided at a downstream side of the first optical element, reflects the red laser light, transmits a first polarized component in the red component, reflects a second polarized component in the red component, transmits the green component and the blue component in the first combined light, and combines the red laser light, the first polarized component, the green component, and the blue component with one another to produce second combined light, a retardation film provided at a downstream side of the second optical element, and a third optical element that is provided at a downstream side of the retardation film and combines part of third combined light that is the second combined light so converted when passing through the retardation film as to have a polarization state different from a polarization state of the second combined light with the second polarized component reflected off the second optical element to produce illumination light.

In the light source apparatus according to the aspect described above, the retardation film may be a half wave plate or a quarter wave plate.

The light source apparatus according to the aspect described above may further include a plurality of reflection mirrors that guide the second polarized component reflected off the second optical element to the third optical element.

In the light source apparatus according to the aspect described above, the retardation film may change phases of the red laser light and the first polarized component in the second combined light.

A projector according to another aspect of the present disclosure includes the light source apparatus according to the aspect described above, a light modulator that modulates light from the light source apparatus in accordance with image information to form image light, and a projection system that projects the image light.

DESCRIPTION OF EXEMPLARY EMBODIMENTS

An embodiment of the present disclosure will be described below with reference to the drawings.

Figure 1:
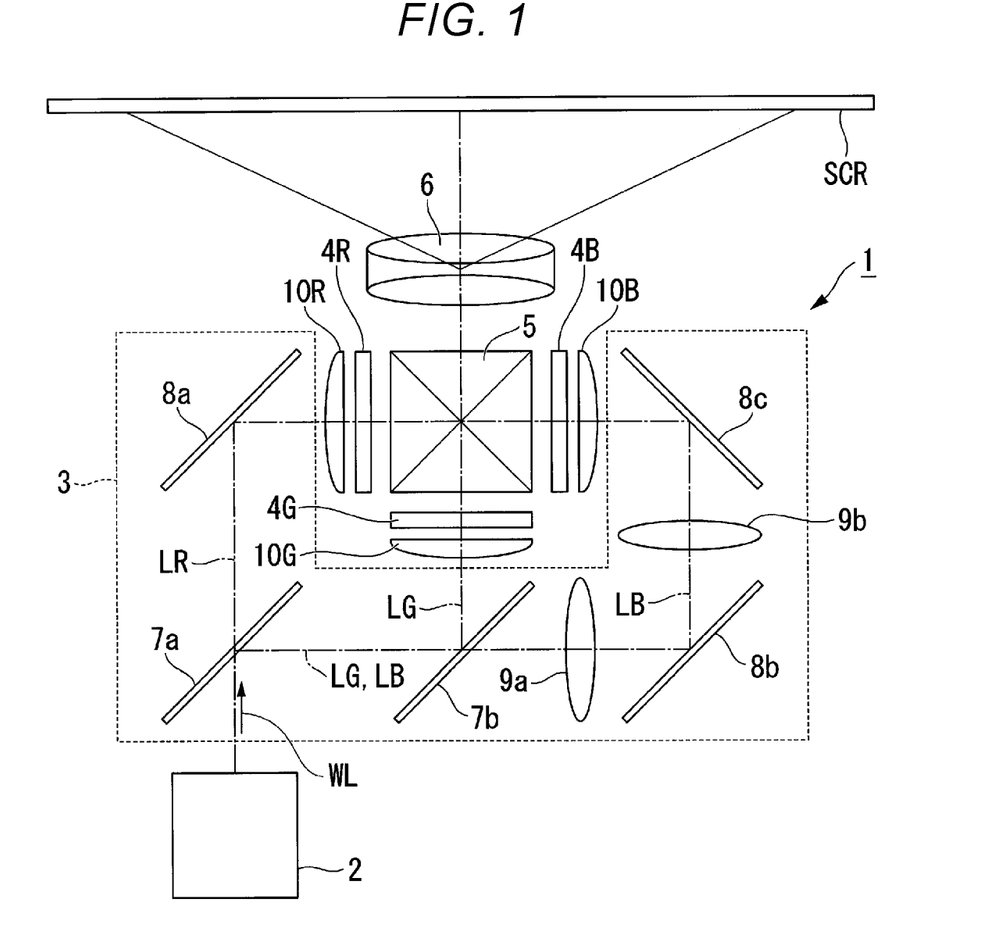
FIG. 1 is a schematic configuration diagram of a projector according to an embodiment.

FIG. 1 is a schematic configuration diagram of a projector according to the present embodiment.

A projector 1 according to the present embodiment is a projection-type image display apparatus that displays color video images on a screen SCR, as shown in FIG. 1. The projector 1 includes a light source apparatus 2, a color separation system 3, a light modulator 4R, a light modulator 4G, and a light modulator 4B, a light combining system 5, and a projection system 6.

The light source apparatus 2 according to the present embodiment outputs white illumination light WL toward the color separation system 3. The color separation system 3 separates the illumination light WL from the light source apparatus 2 into red light LR (light having wavelength band ranging from 600 to 700 nm, for example), green light LG (light having wavelength band ranging from 500 to 600 nm, for example), and blue light LB (light having wavelength band ranging from 440 to 470 nm, for example).

The color separation system 3 generally includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the light source apparatus 2 into the red light LR and the other light (green light LG and blue light LB). The first dichroic mirror 7a transmits the separated red light LR and reflects the other light (green light LG and blue light LB). On the other hand, the second dichroic mirror 7b reflects the green light LG and transmits the blue light LB to separate the other light into the green light LG and the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and guide the blue light LB having passed through the second dichroic mirror 7b to the light modulator 4B. The green light LG is reflected off the second dichroic mirror 7b toward the light modulator 4G.

The first relay lens 9a is disposed in the optical path of the blue light LB between the second dichroic mirror 7b and the second total reflection mirror 8b. The second relay lens 9b is disposed in the optical path of the blue light LB between the second total reflection mirror 8b and the third total reflection mirror 8c.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulator 4R, the light modulator 4G, and the light modulator 4B are each formed, for example, of a transmissive liquid crystal panel. Polarizers (not shown) are disposed on the light incident side and the light exiting side of each of the liquid crystal panels. The light modulator 4R, the light modulator 4G, and the light modulator 4B are hereinafter simply referred to as the light modulators 4R, 4G, and 4B.

A field lens 10R, a field lens 10G, and a field lens 10B are disposed on the light incident side of the light modulators 4R, 4G, and 4B, respectively. The field lens 10R, the field lens 10G, and the field lens 10B convert the red light LR, the green light LG, and the blue light LB to be incident on the light modulators 4R, 4G, and 4B, respectively, into telecentric light.

The image light from the light modulators 4R, 4G, and 4B enters the light combining system 5. The light combining system 5 combines the image light corresponding to the red light LR, the image light corresponding to the green light LG, and the image light corresponding to the blue light LB with one another and causes the combined image light to exit toward the projection system 6. The light combining system 5 is formed, for example, of a cross dichroic prism.

The projection system 6 is formed of a projection lens group, enlarges the combined image light from the light combining system 5, and projects the enlarged image light toward the screen SCR. Enlarged color video images are thus displayed on the screen SCR.

Light Source Apparatus

Figure 2:
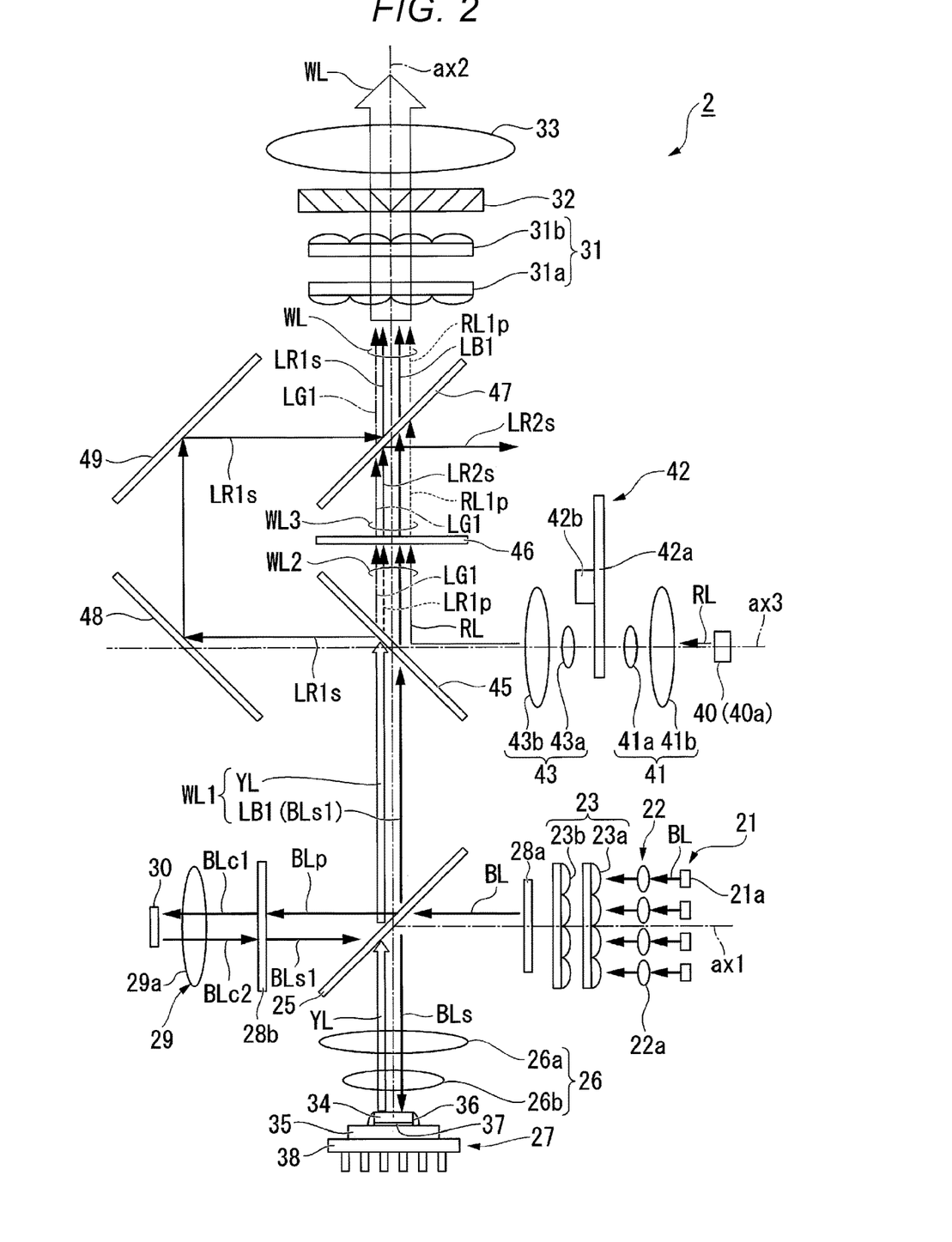
FIG. 2 shows a schematic configuration of a light source apparatus.

The light source apparatus 2 will subsequently be described. FIG. 2 shows a schematic configuration of the light source apparatus 2. The light source apparatus 2 includes a blue array light source 21, a first collimator system 22, a homogenizer system 23, a first retardation film 28a, a polarizing beam splitter (first optical element) 25, a first light collection system 26, a fluorescence emitter 27, a second retardation film 28b, a second light collection system 29, a diffusive reflector 30, a first lens integrator 31, a polarization converter 32, a superimposing lens 33, a red auxiliary light source 40, a third light collection system. 41, a diffuser plate unit 42, a pickup system 43, a polarization separator/combiner (second optical element) 45, a third retardation film 46, a polarization combiner (third optical element) 47, a reflection mirror 48, and a reflection mirror 49, as shown in FIG. 2.

The blue array light source 21, the first collimator system 22, the homogenizer system 23, the first retardation film 28a, the polarizing beam splitter 25, the second retardation film 28b, the second light collection system 29, and the diffusive reflector 30 are sequentially arranged along an optical axis ax1 of the blue array light source 21.

The fluorescence emitter 27, the first light collection system 26, the polarizing beam splitter 25, the polarization separator/combiner 45, the third retardation film 46, the polarization combiner 47, the first lens integrator 31, the polarization converter 32, and the superimposing lens 33 are sequentially arranged along an illumination optical axis ax2. The optical axis ax1 and the illumination optical axis ax2 are present in the same plane and perpendicular to each other.

The red auxiliary light source 40, the third light collection system 41, the diffuser plate unit 42, the pickup system 43, the polarization separator/combiner 45, and the reflection mirror 48 are sequentially arranged along an optical axis ax3 of the red auxiliary light source 40.

The blue array light source 21 includes a plurality of blue laser light emitters 21a. The plurality of blue laser light emitters 21a are arranged in an array in a plane perpendicular to the optical axis ax1. The blue laser light emitters 21a each emit, for example, a light beam BL as blue laser light (blue laser light that belongs to wavelength band ranging from 440 to 470 nm, for example).

The light beams BL outputted from the blue array light source 21 enter the first collimator system 22. The first collimator system 22 converts the light beams BL outputted from the blue array light source 21 into parallelized light beams. The first collimator system 22 is formed, for example, of a plurality of collimator lenses 22a arranged in an array. The plurality of collimator lenses 22a are disposed in correspondence with the plurality of blue laser light emitters 21a.

The light beams BL having passed through the first collimator system 22 enter the homogenizer system 23. The homogenizer system 23 includes multi-lenses 23a and 23b. The homogenizer system 23 cooperates with the first light collection system 26 to homogenize the illuminance distribution on a light illuminated area (phosphor 34). The homogenizer system 23 further cooperates with the second light collection system 29 to homogenize the illuminance distribution on a light illuminated area (diffusive reflector 30).

The light beams BL having passed through the homogenizer system 23 enter the first retardation film 28a. The first retardation film 28a is, for example, a half wave plate configured to be rotatable. The light beams BL emitted from the blue laser light emitters 21a are each linearly polarized light. Appropriately setting the angle of rotation of the first retardation film 28a allows the light beams BL passing through the first retardation film 28a to contain S-polarized light and P-polarized light with respect to the polarizing beam splitter 25 mixed with each other at a predetermined ratio. The ratio between the S-polarized light and the P-polarized light can be changed by rotating the first retardation film 28a.

The light beams BL containing the S-polarized light and the P-polarized light produced when the light beams BL pass through the first retardation film 28a enter the polarizing beam splitter 25. The polarizing beam splitter 25 is so disposed as to incline by 45° with respect to the optical axis ax1 and the illumination optical axis ax2.

The polarizing beam splitter 25 has a polarization separation function of separating the light beams BL into S-polarized light beams BLs and P-polarized light beams BLp with respect to the polarizing beam splitter 25. The polarizing beam splitter 25 further has a color separation function of transmitting fluorescence YL, which belongs to a wavelength band different from the wavelength band to which the light beams BL belong, irrespective of the polarization state of the fluorescence YL.

Specifically, the polarizing beam splitter 25 reflects the S-polarized light beams BLs (first component of blue laser light) and transmits the P-polarized light beams BLp (second component of blue laser light). The S-polarized light beams BLs having exited out of the polarizing beam splitter 25 enter the first light collection system 26. The first light collection system 26 collects the light beams BLs and directs the collected light beams BLs toward the phosphor 34.

In the present embodiment, the first light collection system 26 is formed, for example, of a first lens 26a and a second lens 26b. The light beams BLs having traveled via the homogenizer system 23 and the first light collection system 26 are incident on a light illuminated area of the fluorescence emitter 27 in the form of light beams having a homogenized illuminance distribution. The fluorescence emitter 27 includes the phosphor 34, a substrate 35, which supports the phosphor 34, and a fixing member 36, which fixes the phosphor 34 to the substrate 35.

In the present embodiment, the phosphor 34 is fixed to the substrate 35 by using the fixing member 36 provided between the side surface of the phosphor 34 and the substrate 35. The phosphor 34 has a surface on which the light beams BLs are incident and a surface opposite the light incident surface and in contact with the substrate 35.

The phosphor 34 contains a phosphor that absorbs the light beams BLs and is excited by the absorbed light beams BLs. The phosphor excited by the light beams BLs emits the fluorescence (yellow fluorescence) YL having a wavelength band ranging, for example, from 500 to 700 nm.

A reflector 37 is provided on a side of the phosphor 34 that is the side opposite the side on which the light beams BLs are incident (side opposite first light collection system 26). The reflector 37 reflects a component of the fluorescence YL produced in the phosphor 34 that is the component traveling toward the substrate 35.

A heat sink 38 is disposed on a surface of the substrate 35 that is the surface opposite the surface that supports the phosphor 34. Heat produced by the fluorescence emitter 27 can be dissipated via the heat sink 38, whereby thermal degradation of the phosphor 34 can be avoided.

Part of fluorescence YL produced in the phosphor 34 is reflected off the reflector 37 and exits out of the phosphor 34. Another part of the fluorescence YL produced in the phosphor 34 exits out of the phosphor 34 via no reflector 37. The fluorescence YL thus exits out of the phosphor 34. The fluorescence YL is non-polarized light.

On the other hand, the P-polarized light beams BLp having exited out of the polarizing beam splitter 25 enter the second retardation film 28b. The second retardation film 28b is formed of a quarter wave plate disposed in the optical path between the polarizing beam splitter 25 and the diffusive reflector 30. The P-polarized light beams BLp having exited out of the polarizing beam splitter 25 are therefore converted by the second retardation film 28b into, for example, right-handed circularly polarized blue light BLc1, which then enters the second light collection system 29. The second light collection system. 29 is formed, for example, of lens 29a. The blue light BLc1 having traveled via the homogenizer system 23 and the second light collection system 29 is incident on the diffusive reflector 30 in the form of light having a homogenized illumination distribution.

The diffusive reflector 30 is disposed in the position of a mirror image of the phosphor 34 with respect to the polarizing beam splitter 25 and diffusively reflects the blue light BLc1 having exited out of the second light collection system 29 toward the polarizing beam splitter 25. The diffusive reflector 30 preferably reflects the blue light BLc1 in a Lambertian reflection scheme but does not disturb the polarization state of the blue light BLc1.

The light diffusively reflected off the diffusive reflector 30 is hereinafter referred to as blue light BLc2. According to the present embodiment, diffusively reflecting the blue light BLc1 results in blue light BLc2 having a substantially uniform illuminance distribution. For example, the right-handed circularly polarized blue light BLc1 is reflected in the form of left-handed circularly polarized blue light BLc2. The blue light BLc2 is converted by the second light collection system 29 into parallelized light, which is then incident on the second retardation film 28b again.

The left-handed circularly polarized blue light BLc2 is converted by the second retardation film 28b into S-polarized blue light BLs1. The S-polarized blue light BLs1 is reflected off the polarizing beam splitter 25 toward the first lens integrator 31.

The blue light BLs1 and the fluorescence YL thus exit out of the polarizing beam splitter 25 in the same direction. The blue light BLs1 and the fluorescence YL are therefore combined with each other by the polarizing beam splitter 25 to produce first combined light WL1. The first combined light WL1 is white light containing a red component LR1, a green component LG1, and a blue component LB1. The blue light component LB1 corresponds to the blue light BLs1.

For example, to produce 6500-K white light as the illumination light, the first combined light WL1 has an insufficient amount of red component. In the light source apparatus 2 according to the present embodiment, the light outputted from the red auxiliary light source 40 compensates the insufficient amount of red component in the illumination light WL. The red auxiliary light source 40 includes a red laser light emitter 40a. The red laser light emitter 40a emits, for example, a red auxiliary light beam RL as red laser light (red laser light having peak wavelength within range from 630 to 650 nm, for example). The red auxiliary light beam RL is linearly polarized light. Specifically, the red auxiliary light beam RL is S-polarized light with respect to the polarization separator/combiner 45, which will be described later. The number of red laser light emitters 40a is not limited to a specific value.

The red auxiliary light beam RL emitted from the red laser light emitter 40a enters the third light collection system 41. The third light collection system 41 is formed of lenses 41a and 41b, collects the red auxiliary light beam RL, and causes the collected red auxiliary light beam RL to enter the diffuser plate unit 42. Occurrence of speckles resulting from the red auxiliary light beam RL, which is formed of laser light, can thus be reduced.

The diffuser plate unit 42 includes a light transmissive, disc-shaped diffuser plate 42a and a motor 42b, which rotates the diffuser plate 42a. The diffuser plate unit 42 rotates the diffuser plate 42a to temporally change the position where the red auxiliary light beam RL is incident.

The red auxiliary light beam RL is therefore not incident on a single location on the diffuser plate 42a in a concentrated manner, whereby breakage of the diffuser plate 42a due to heat is avoided.

The red auxiliary light beam RL diffused when passing through the diffuser plate unit 42 enters the pickup system 43. The pickup system 43 is formed of lenses 43a and 43b, picks up and parallelizes the diffused red auxiliary light beam RL, and guides the parallelized red auxiliary light beam RL to the polarization separator/combiner 45.

The polarization separator/combiner 45 is so disposed as to incline by 45° with respect to the optical axis ax3. The polarization separator/combiner 45 has a polarization separation function of separating the red component LR1 in the first combined light WL1 into P-polarized red first component (first polarized component) LR1p and S-polarized red second component (second polarized component) LR1s with respect to the polarization separator/combiner 45. The ratios of the red first component LR1p and the red second component LR1s to the red component LR1 are 50:50.

The polarization separator/combiner 45 is characterized in that it transmits the green component LG1 and the blue component LB1 in the first combined light WL1 irrespective of the polarization states of the green component LG1 and the blue component LB1. The green component LG1 and the blue component LB1 having passed through the polarization separator/combiner 45 enter the third retardation film 46.

The polarization separator/combiner 45 in the present embodiment reflects the S-polarized red second component LR1s and transmits the P-polarized red first component LR1p. The S-polarized red second component LR1s separated when reflected off the polarization separator/combiner 45 is incident on the reflection mirror 48. The reflection mirror 48 is formed of a total reflection mirror so disposed as to incline by 45° with respect to the optical axis ax3. The red second component LR1s reflected off the reflection mirror 48 is incident on the reflection mirror 49. The reflection mirror 49 is formed of a total reflection mirror so disposed as to incline by 45° with respect to the optical axis of the red second component LR1s. The reflection mirror 49 reflects the red second component LR1s reflected off the reflection mirror 48 toward the polarization combiner 47.

On the other hand, the P-polarized red first component LR1p separated when passing through the polarization separator/combiner 45 enters the third retardation film 46. The third retardation film 46 corresponds to the "retardation film" set forth in the appended claims.

In the present embodiment, the red auxiliary light beam RL diffused by the diffuser plate unit 42, which is S-polarized with respect to the polarization separator/combiner 45, is reflected off the polarization separator/combiner 45 and enters the third retardation film 46.

The red auxiliary light beam RL, the red first component LR1p, the green component LG1, and the blue component LB1 exit out of the polarization separator/combiner 45 toward the third retardation film 46. That is, the polarization separator/combiner 45 combines the red auxiliary light beam RL, the red first component LR1p, the green component LG1, and the blue component LB1 with one another to produce second combined light WL2.

In the present embodiment, the third retardation film 46 is a half wave plate. The third retardation film 46 is formed of a red-narrow-band half wave retardation film that changes the phase of light that belongs to a red wavelength band. The thus configured third retardation film 46 changes the phases of the red laser light (red auxiliary light beam RL) and the red first component LR1p in the second combined light WL2 (incident light).

The red first component LR1p, which is P-polarized light, is converted into an S-polarized light beam LR2s when passing through the third retardation film 46, and the red auxiliary light beam RL, which is S-polarized light, is converted into P-polarized red auxiliary light beam RL1p when passing through the third retardation film 46.

The second combined light WL2 is therefore converted into third combined light WL3 having a polarization state different from that of the second combined light WL2 when passing through the third retardation film 46. The third combined light WL3 contains the S-polarized light beam LR2s, the P-polarized red auxiliary light beam RL1p, the blue component LB1, and the green component LG1. The third combined light WL3 enters the polarization combiner 47.

The polarization combiner 47 is so disposed as to incline by 45° with respect to the illumination optical axis ax2. The polarization combiner 47 has a polarization separation function of separating the red component in the third combined light WL3, which is the light incident on the polarization combiner 47, into an S-polarized light beam and a P-polarized light beam with respect to the polarization combiner 47. The polarization combiner 47 is characterized in that it transmits the green component LG1 and the blue component LB1 in the third combined light WL3 irrespective of the polarization states thereof.

In the present embodiment, the polarization combiner 47 separates the red component (S-polarized light beam LR2s and P-polarized red auxiliary light beam RL1p) of the third combined light WL3 in terms of polarization state. The P-polarized red auxiliary light beam RL1p passes through the polarization combiner 47, and the S-polarized light beam LR2s is reflected off the polarization combiner 47 and exits in a direction different from the direction in which the red auxiliary light beam RL1p exits. The red component reflected off the polarization combiner 47 (S-polarized light beam LR2s) is blocked by a light blocking member that is not shown and is not used to form the illumination light WL.

The polarization combiner 47 transmits the green component LG1 and the blue component LB1. That is, the polarization combiner 47 transmits part of the third combined light WL3 (red auxiliary light beam RL1p, green component LG1, and blue component LB1). Further, the polarization combiner 47 reflects the red second component LR1s having been separated by the polarization separator/combiner 45 and having then traveled via the reflection mirrors 48 and 49 and causes the reflected red second component LR1s to exit in the same direction as the direction in which the red auxiliary light beam RL1p, the green component LG1, and the blue component LB1, which are part of the third combined light WL3, exit.

As described above, the polarization combiner 47 in the present embodiment combines the part of the third combined light WL3 (red auxiliary light beam RL1p, green component LG1, and blue component LB1) with the red second component LR1s to produce the illumination light WL. The red auxiliary light beam RL1p corresponds to the total luminous flux (100%) of the red auxiliary light beam RL outputted from the red auxiliary light source 40, and the red second component LR1s corresponds to half of the total luminous flux (50%) of the red component LR1 of the fluorescence YL.

As described above, the light source apparatus 2 according to the present embodiment can use 50% of the red component LR1 of the fluorescence YL to form the illumination light WL and use 100% of the red auxiliary light beam RL outputted from the red auxiliary light source 40 to form the illumination light WL.

The illumination light WL exits toward the first lens integrator 31. The first lens integrator 31 includes a first multi-lens 31a and a second multi-lens 31b. The first multi-lens 31a includes a plurality of first lenslets 31am for dividing the illumination light WL into a plurality of sub-light beam fluxes.

The lens surface of the first multi-lens 31a (surfaces of first lenslets 31am) is optically conjugate with an image formation area of each of the light modulators 4R, 4G, and 4B. To this end, the first lenslets 31am each have a shape (rectangular shape) substantially similar to the shape of the image formation area of each of the light modulators 4R, 4G, and 4B. The sub-light fluxes having exited out of the first multi-lens 31a are therefore efficiently incident on the image formation area of each of the light modulators 4R, 4G, and 4B.

The second multi-lens 31b includes a plurality of second lenslets 31bm corresponding to the plurality of first lenslets 31am of the first multi-lens 31a. The second multi-lens 31b along with the superimposing lens 33 forms images of the first lenslets 31am of the first multi-lens 31a in the vicinity of the image formation area of each of the light modulators 4R, 4G, and 4B.

The illumination light WL having passed through the first lens integrator 31 enters the polarization converter 32. The polarization converter 32 is formed of polarization separation films and retardation films (half wave retardation films) arranged in an array. The polarization converter 32 converts the polarization direction of the illumination light WL into a predetermined direction. More specifically, the polarization converter 32 causes the polarization direction of the illumination light WL to align with the direction of the transmission axis of a polarizer (not shown) disposed on the light incident side of each of the light modulators 4R, 4G, and 4B. The polarization directions of the red light R, the green light LG, and the blue light LB produced by separating the illumination light WL as described above thus align with the direction of the transmission axis of the polarizer disposed on the light incident side of each of the light modulators 4R, 4G and 4B. The red light LR, the green light LG, and the blue light LB are therefore not blocked by the light-incident-side polarizers but are satisfactorily guided to the image formation areas of the light modulators 4R, 4G, and 4B.

The illumination light WL having passed through the polarization converter 32 enters the superimposing lens 33. The superimposing lens 33 cooperates with the first lens integrator 31 to homogenize the illuminance distribution of the illumination light WL in the areas illuminated therewith.

As described above, the light source apparatus 2 according to the present embodiment can use 50% of the red component LR1 of the fluorescence YL and 100% of the red auxiliary light beam RL outputted from the red auxiliary light source 40 to produce the illumination light WL. That is, the light source apparatus 2 according to the present embodiment can produce white light having no shortage of the red component as the illumination light WL.

Further, in the light source apparatus 2 according to the present embodiment, adjusting the power of the red laser light (red auxiliary light beam RL1p) outputted from the red auxiliary light source 40 allows arbitrary control of the amount of assistance in forming the red component (red light LR) of the illumination light WL. The white balance of the illumination light WL produced by the light source apparatus 2 can therefore be optimized.

Further, in the light source apparatus 2 according to the present embodiment, the S-polarized red second component LR1s separated by the polarization separator/combiner 45 is reflected off the reflection mirrors 48 and 49 and guided to the polarization combiner 47, whereby the red second component LR1s can be used to form the illumination light WL.

Further, since the light source apparatus 2 according to the present embodiment includes the red-narrow-band half wave retardation film, which changes the phase of light that belongs to a red wavelength band, as the third retardation film 46, only the phase of the red light (red first component LR1p and red auxiliary light beam RL) can be changed. Converting the polarization direction of the red laser light (red auxiliary light beam RL) therefore allows the polarization combiner 47 to combine the red laser light as part of the illumination light WL.

The present disclosure is not limited to the content of the embodiment described above and can be changed as appropriate to the extent that the change does not depart from the substance of the present disclosure.

For example, in the embodiment described above, the case where the third retardation film 46 is a half wave plate, but not necessarily in the present disclosure.

Figure 3:
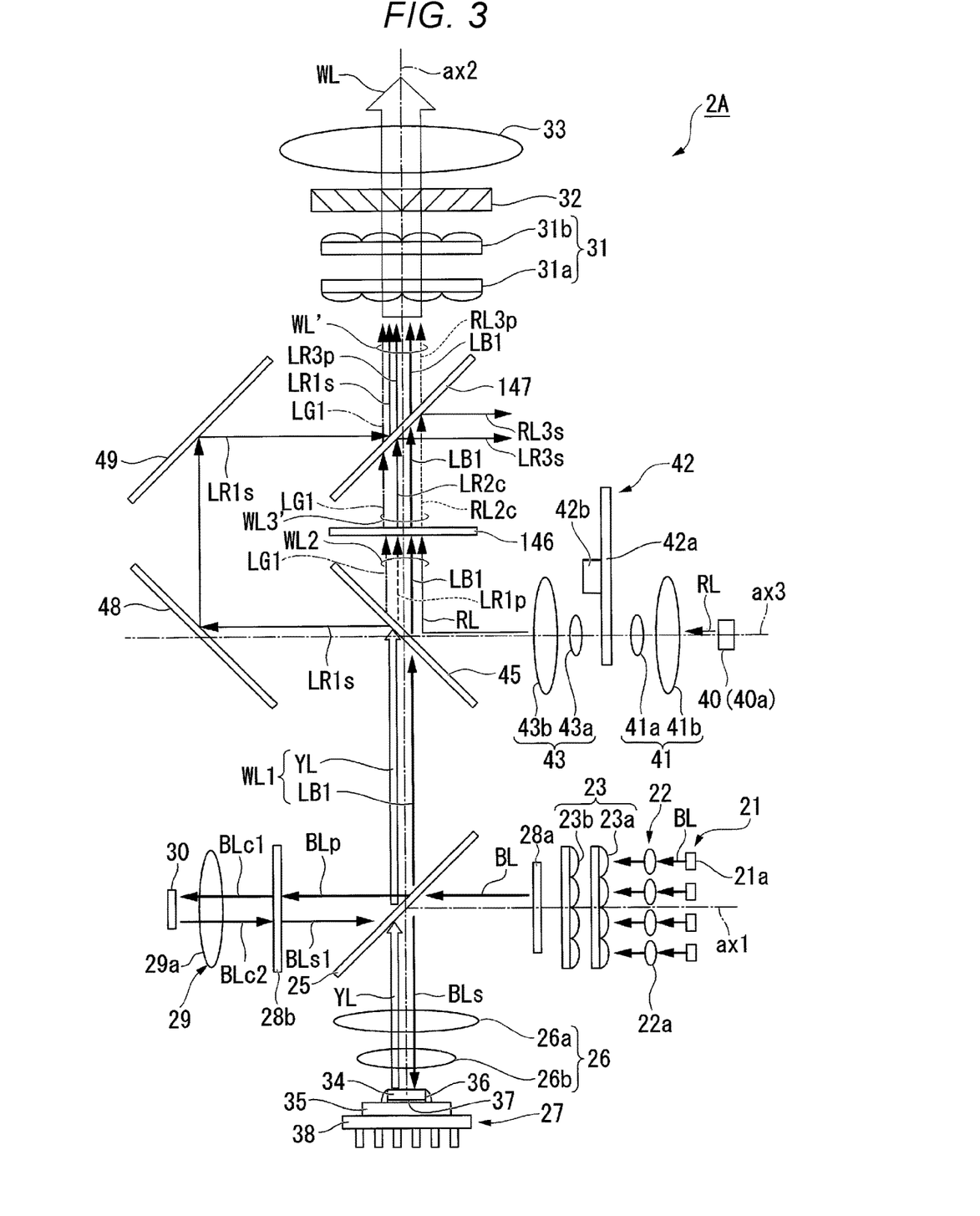
FIG. 3 shows the configuration of key parts of a light source apparatus according to a variation.

FIG. 3 shows the configuration of key parts of a light source apparatus according to a variation. A third retardation film 146 is a quarter wave plate, as shown in FIG. 3. A light source apparatus 2A shown in FIG. 3 has the same configuration as that in the embodiment described above except that the third retardation film 146 is formed of a quarter wave plate. An effect provided by the third retardation film 146 will therefore be primarily described below, and the other configurations will not be described or will be described in a simplified manner.

The third retardation film 146 changes the phases of the red laser light (red auxiliary light beam RL) and the red first component LR1p of the second combined light WL2 (light incident on third retardation film 146). The P-polarized red first component LR1p is converted, for example, into right-handed red circularly polarized light LR2c when passing through the third retardation film 146. The S-polarized red auxiliary light beam RL is converted, for example, into a red auxiliary light beam RL2c, which is left-handed circularly polarized light, when passing through the third retardation film 146.

The second combined light WL2 is therefore converted into third combined light WL3' having a polarization state different from that of the third combined light WL3 when passing through the third retardation film 146. The third combined light WL3' contains the right-handed red circularly polarized light LR2c, the red auxiliary light beam RL2c, which is left-handed circularly polarized light, the blue component LB1, and the green component LG1.

A polarization combiner (third optical element) 147 in the present variation separates the red component of the third combined light WL3' in terms of polarization state. The polarization combiner 147 separates the right-handed red circularly polarized light LR2c in the third combined light WL3' into P-polarized red component LR3p and S-polarized red component LR3s. The ratio between the red component LR3p and the red component LR3s is 50:50, and only the P-polarized red component LR3p is used to form the illumination light after passing through the polarization combiner 147, as will be described later.

The polarization combiner 147 further separates the red auxiliary light beam RL2c, which is left-handed circularly polarized light, in the third combined light WL3' into P-polarized red auxiliary light beam RL3p and S-polarized red auxiliary light beam RL3s. The ratio between the red auxiliary light beam RL3p and the red auxiliary light beam RL3s is 50:50, and only the P-polarized red auxiliary light beam RL3p is used to form the illumination light, as will be described later.

The red component LR3p, which is P-polarized light, and the red auxiliary light beam RL3p pass through the polarization combiner 147, and the red component LR3s, which is S-polarized light, and the red auxiliary light beam RL3s are reflected off the polarization combiner 147 and exit in a direction different from the direction in which the red component LE3p and the red auxiliary light beam RL3p exit. The red component LR3s and the red auxiliary light beam RL3s reflected off the polarization combiner 147 are blocked by a light blocking member that is not shown and are not used to form the illumination light.

The polarization combiner 147 in the present variation transmits part of the third combined light WL3' (red component LR3p, red auxiliary light beam RL3p, and blue light BLs1), reflects the red second component LR1s having exited out of the polarization separator/combiner 45 and traveled via the reflection mirrors 48 and 49, and causes the reflected red second component LR1s to exit in the same direction as the direction in which the red component LR3p, the red auxiliary light beam RL3p, and the blue light BLs1, which are part of the third combined light WL3', exit.

The polarization combiner 147 in the present variation thus combines part of the third combined light WL3' (red component LR3p, red auxiliary light beam RL3p, and blue light BLs1) with the red second component LR1s to produce illumination light WL'. The red auxiliary light beam RL3p corresponds to half of the total luminous flux (50%) of the red auxiliary light beam RL outputted from the red auxiliary light source 40, the red second component LR1s corresponds to half of the total luminous flux (50%) of the red component LR1 of the fluorescence YL, and the red component LR3p corresponds to one fourth (25%) of the total luminous flux of the red component LR1 of the fluorescence YL.

That is, the light source apparatus 2A according to the present variation can use 75% of the red light component LR1 of the fluorescence YL to form the illumination light WL' and use 50% of the red auxiliary light beam RL outputted from the red auxiliary light source 40 to form the illumination light WL'. According to the present variation, the illumination light WL' can be so produced as to contain an increased proportion of the red component LR1 formed of the fluorescence YL and a decreased proportion of the red auxiliary light beam RL formed of laser light. The light source apparatus 2A according to the present variation can therefore produce white light having no shortage of the red component with the number of speckles reduced as the illumination light WL'.

Further, the above embodiment has been described with reference to the case where the light source apparatus according to the embodiment of the present disclosure is incorporated in a projector, but not necessarily. The light source apparatus according to the embodiment of the present disclosure can also be used as a lighting apparatus, a headlight of an automobile, and other components.

What is claimed is:
1. A light source apparatus comprising:
a blue laser light emitter that emits blue laser light;
a red laser light emitter that emits red laser light;
a phosphor that produces yellow fluorescence when excited by a first component of the blue laser light;
a first optical element that combines the yellow fluorescence with a second component of the blue laser light to produce first combined light containing a red component, a green component, and a blue component;
a second optical element that is provided at a downstream side of the first optical element, reflects the red laser light, transmits a first polarized component in the red component, reflects a second polarized component in the red component, transmits the green component and the blue component in the first combined light, and combines the red laser light, the first polarized component, the green component, and the blue component with one another to produce second combined light;
a retardation film provided at a downstream side of the second optical element; and
a third optical element that is provided at a downstream side of the retardation film and combines part of third combined light that is the second combined light so converted when passing through the retardation film as to have a polarization state different from a polarization state of the second combined light with the second polarized component reflected off the second optical element to produce illumination light.

2. The light source apparatus according to claim 1, wherein the retardation film is a half wave plate.

3. The light source apparatus according to claim 1, wherein the retardation film is a quarter wave plate.

4. The light source apparatus according to claim 1 further comprising a plurality of reflection mirrors that guide the second polarized component reflected off the second optical element to the third optical element.

5. The light source apparatus according to claim 2 further comprising a plurality of reflection mirrors that guide the second polarized component reflected off the second optical element to the third optical element.

6. The light source apparatus according to claim 3 further comprising a plurality of reflection mirrors that guide the second polarized component reflected off the second optical element to the third optical element.

7. The light source apparatus according to claim 1, wherein the retardation film changes phases of the red laser light and the first polarized component in the second combined light.

8. The light source apparatus according to claim 2, wherein the retardation film changes phases of the red laser light and the first polarized component in the second combined light.

9. The light source apparatus according to claim 3, wherein the retardation film changes phases of the red laser light and the first polarized component in the second combined light.

10. The light source apparatus according to claim 4, wherein the retardation film changes phases of the red laser light and the first polarized component in the second combined light.

11. A projector comprising:
the light source apparatus according to claim 1;
a light modulator that modulates light from the light source apparatus in accordance with image information to form image light; and
a projection system that projects the image light.

12. A projector comprising:
the light source apparatus according to claim 2;
a light modulator that modulates light from the light source apparatus in accordance with image information to form image light; and
a projection system that projects the image light.

13. A projector comprising:
the light source apparatus according to claim 3;
a light modulator that modulates light from the light source apparatus in accordance with image information to form image light; and
a projection system that projects the image light.

14. A projector comprising:
the light source apparatus according to claim 4;
a light modulator that modulates light from the light source apparatus in accordance with image information to form image light; and
a projection system that projects the image light.

15. A projector comprising:
the light source apparatus according to claim 5;
a light modulator that modulates light from the light source apparatus in accordance with image information to form image light; and
a projection system that projects the image light.

16. A projector comprising:
the light source apparatus according to claim 6;
a light modulator that modulates light from the light source apparatus in accordance with image information to form image light; and
a projection system that projects the image light.

17. A projector comprising:
the light source apparatus according to claim 7;
a light modulator that modulates light from the light source apparatus in accordance with image information to form image light; and
a projection system that projects the image light.

18. A projector comprising:
the light source apparatus according to claim 8;
a light modulator that modulates light from the light source apparatus in accordance with image information to form image light; and
a projection system that projects the image light.

19. A projector comprising:
the light source apparatus according to claim 9;
a light modulator that modulates light from the light source apparatus in accordance with image information to form image light; and
a projection system that projects the image light.

20. A projector comprising:
the light source apparatus according to claim 10;
a light modulator that modulates light from the light source apparatus in accordance with image information to form image light; and
a projection system that projects the image light.

\* \* \* \* \*